Sept. 4, 1956 R. A. HIRSCH 2,761,519
PROPELLER VARIABLE PITCH CHANGE MECHANISM
Filed May 21, 1952 3 Sheets-Sheet 2

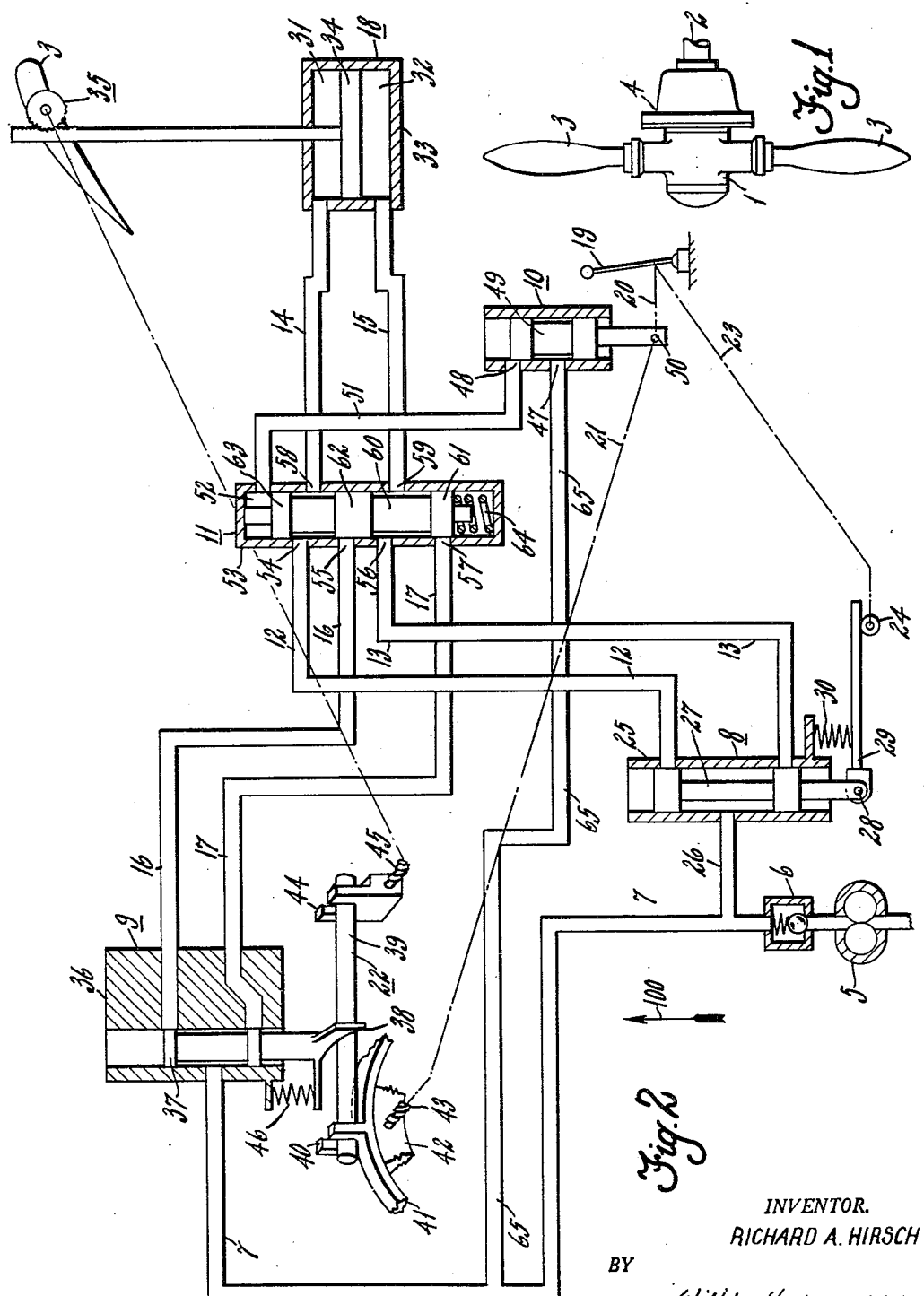

INVENTOR.
RICHARD A. HIRSCH
BY
Willite, Hardman and Fehr
HIS ATTORNEYS

Sept. 4, 1956 R. A. HIRSCH 2,761,519
PROPELLER VARIABLE PITCH CHANGE MECHANISM
Filed May 21, 1952 3 Sheets-Sheet 3
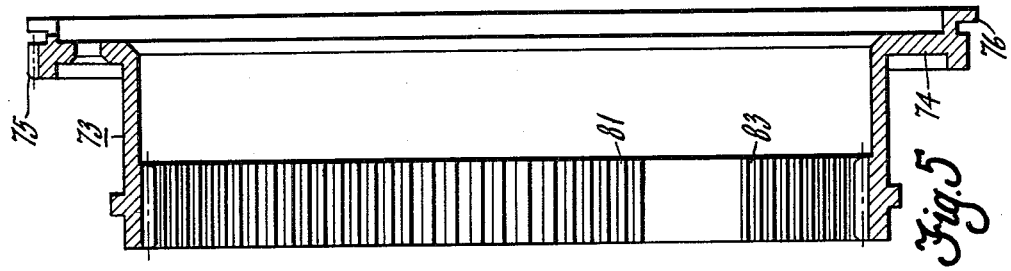
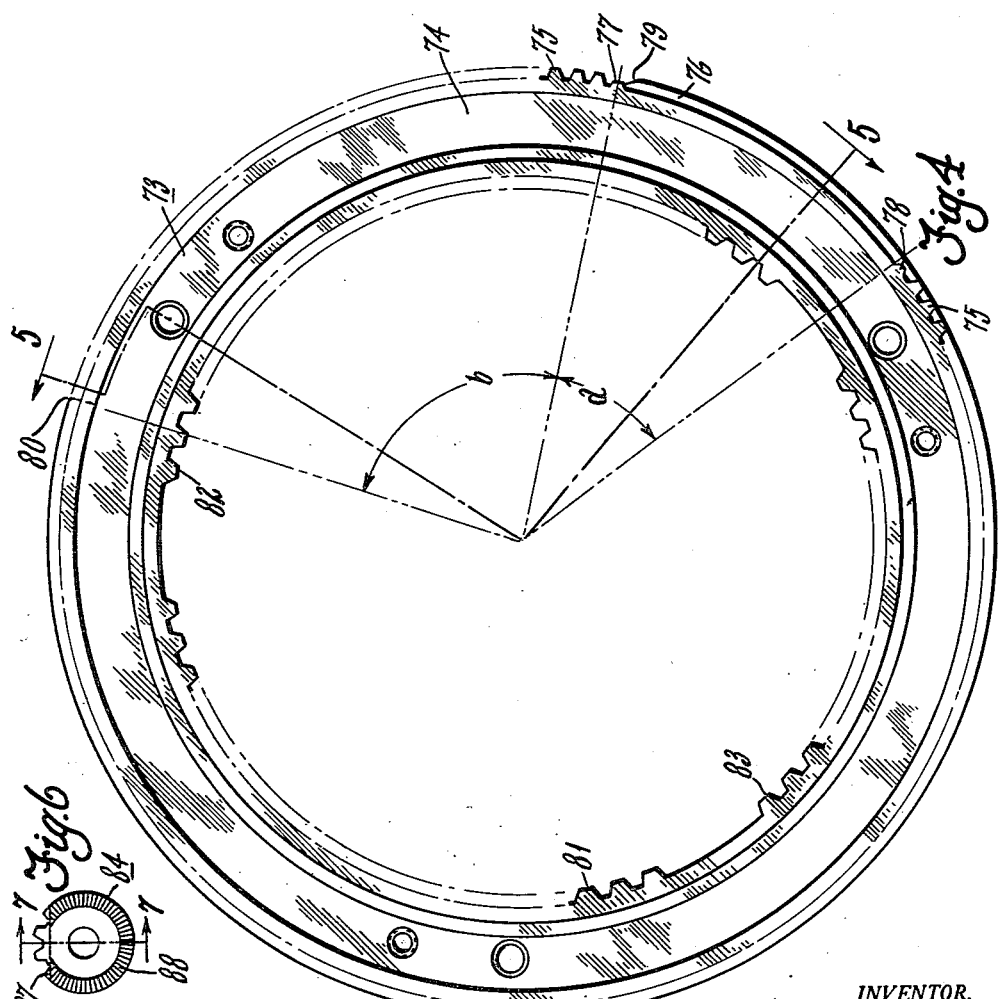
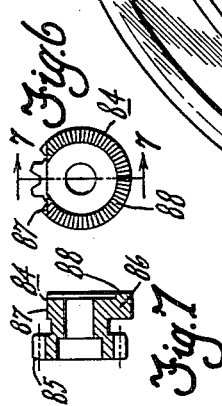
INVENTOR.
RICHARD A. HIRSCH
BY
HIS ATTORNEYS United States Patent Office 2,761,519
Patented Sept. 4, 1956

2,761,519

PROPELLER VARIABLE PITCH CHANGE MECHANISM

Richard A. Hirsch, West Milton, Ohio, assignor to General Motors Corporation, Detroit, Mich., a corporation of Delaware Application May 21, 1952, Serial No. 289,110

7 Claims. (Cl. 170—160.21)

The present invention relates to variable pitch propellers, and more particularly to feedback mechanism associated therewith.

In variable pitch propellers of the type having fluid pressure actuated torque units for adjusting propeller pitch, the space available for the various control valves is, of necessity, limited. However, to obtain the desired flexibility and accuracy required in selecting a particular blade angle in a blade angle or beta regime of propeller operation, it is necessary to utilize a follow-up or feedback mechanism to reposition a beta distributor valve and correlate selected blade angle changes with actual movement of the propeller blades. Consequently, the need has arisen for feedback mechanism, which incorporates means allowing greater movement per degree of blade angle change in the beta regime than had previously been provided. Accordingly, one of my objects is to provide a feedback mechanism having means affording substantial feedback travel per degree of blade angle movement.

The aforementioned and other objects are accomplished in the present invention by providing a rotary feedback mechanism that is only functionally operative in the beta regime. This is feasible in the present invention by reason that the beta distributor valve, associated with the feedback mechanism, is only operative in the beta regime. Accordingly, the limited space provided is utilized to better advantage to afford a more accurate and sensitive control.

Specifically, the variable pitch propeller includes a master gear, which is actuated by gears associated with each of the several propeller blades for coordinating their movements as a unit. The master blade gear is operatively connected to a ring member, rotatably journaled coaxially of the propeller shaft. On a radial extension of the external circumferential surface of the ring and separated axially thereon, are a series of teeth and a radially extending flange. The teeth are relieved throughout a predetermined arcuate segment, and the flange is relieved throughout another predetermined arcuate segment disposed angularly adjacent thereto. The toothed portion is adapted to drivingly engage a pinion gear. The pinion is provided with an axial extension of generally circular external configuration except for a flat provided thereon. The several parts are so arranged and disposed that lost motion is present, or no movement will be transmitted to the pinion when the toothless portion of the ring is contiguously located with respect to the pinion, by reason of the flange being positioned adjacent the flat on the pinion extension. However, during a portion of toothed engagement between the pinion and the ring, the flange is relieved to permit transmission of movement to the pinion.

The pinion drives a feedback shaft, which is provided with means for repositioning a beta distributor valve feedback carriage. In this manner no feedback movement is transmitted to the feedback carriage when the propeller is operated in the governed speed regime, thus, affording a flat response curve. However, in the beta regime, where feedback travel is a requisite, a greater movement per degree of blade angle change is provided.

Further objects and advantages of the present invention will be apparent from the following description, reference being had to the accompanying drawings wherein a preferred embodiment of the present invention is clearly shown.

In the drawings:

Fig. 1 is a perspective view of a variable pitch propeller unit.

Fig. 2 is a schematic diagram of a typical hydraulic circuit utilized to control pitch changing movements of the blades.

Fig. 4 is an elevational view of the feedback ring.

Fig. 5 is a sectional view taken on line 5—5 of Fig. 4.

Fig. 6 is an elevational view of the feedback pinion.

Fig. 7 is a sectional view taken on line 7—7 of Fig. 6.

Figure 3:
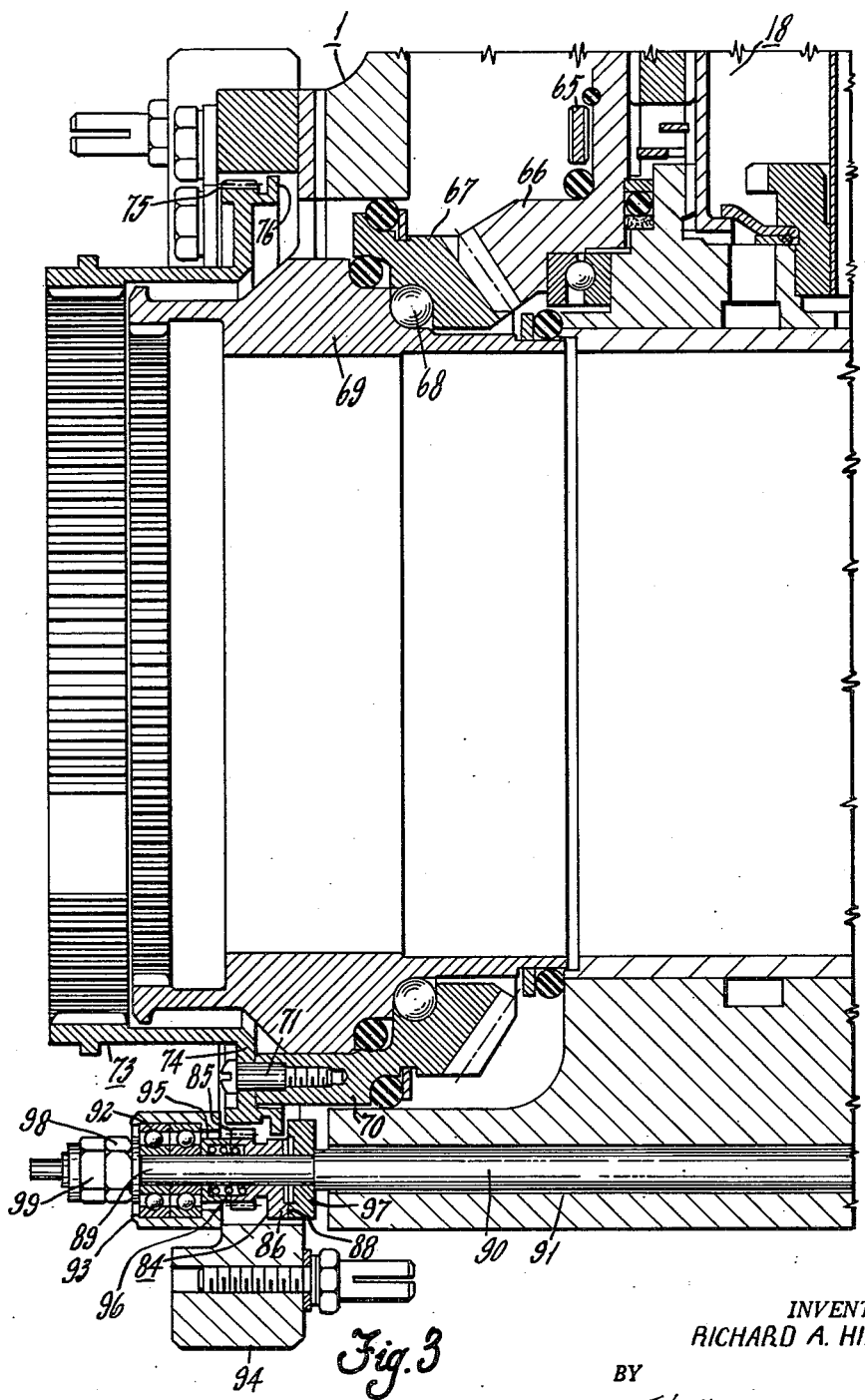
Fig. 3 is a fragmentary sectional view through a portion of the propeller hub.

Referring particularly to Fig. 1, propeller unit is shown including a hub 1, which is rotated by a shaft 2, the hub having a plurality of sockets, which are adapted to receive blades 3. The blades are rotatably journaled in the sockets for movement about their longitudinal axes. Anchored to the hub 1, and rotatable therewith, is a regulator 4. The regulator 4 encloses the hydraulic circuit, shown in Fig. 2, which is utilized to effect pitch changing movements of the blades 3 in a manner similar to that disclosed in Blanchard et al. Patents 2,307,101 and 2,307,102.

Referring to Fig. 2, a typical hydraulic fluid pressure system for controlling the movements of the blades 3 includes a pump 5 continuously driven during propeller rotation. The output of pump 5 is discharged through a check valve 6 and into a trunk line 7. The trunk line 7 is connected to supply ports of a governor valve 8 and a beta distributor valve 9. In addition, the trunk line 7 is connected with a supply port of a selector control valve 10. The selector control valve 10, manually actuated, controls the position of a servo actuated selector valve 11. The selector valve 11 has two operative positions, one of them connecting the control lines 12 and 13 of the governor valve 8 with the lines 14 and 15 and the other position connecting the control lines 16 and 17 of the beta distributor valve 9 with the lines 14 and 15. The governor valve 8 controls the flow of fluid to and from a blade actuating torque unit 18 during propeller operation in the governed speed regime, while the beta distributor valve 9 controls the application of fluid pressure through the torque unit 18 during the operation in the beta regime. In the instant disclosure, the beta regime is defined by way of example as including the range between positive 10° blade angle and the mechanical stop defining the lowest negative blade angle. However, the principle of the present invention could also be utilized in a propeller having a more extensive beta regime including the higher positive angles from 50° positive to the full feathered position.

The regimes of propeller operation are controlled manually by the pilot through movement of a power lever 19. The power lever 19 is connected by mechanical linkage 20 to the selector valve 10, which, in turn, is connected by linkage 21 to a beta distributor valve carriage 22. The power lever 19 is also connected by a mechanical linkage 23 to a movable fulcrum 24 associated with the speed sensitive or governor valve 8. The governor valve 8 comprises a valve guide 25 having a supply port and a pair of control ports. The supply port is connected by line 26 to the trunk line 7. Disposed within the valve guide 25 and mounted for reciprocal movement therein is a valve plunger 27 having a pair of spaced lands, which are adapted to cooperate with the control ports. One end of the plunger 27 is pivotally connected at 28 to one end of a lever 29. The other end of the lever 29 rests on the movable fulcrum 24, while a spring 30 engages an intermediate portion thereof.

With the various control valves in the position shown in Fig. 2, a propeller is operating in the governed speed regime. That is, the plunger 27 of the speed sensitive valve 8 will assume an equilibrium position under the opposing forces of centrifugal force in the direction of arrow 100 and the spring 30 acting on the lever 29. The effective force of the spring 30 may be varied by movement of the fulcrum 24 and, thus, a range of speed settings is afforded. During operation in the governed speed regime, an overspeed condition of the propeller will effect an upward movement of the plunger 27, thereby causing the application of fluid under pressure from trunk line 7 through lines 26 and 12, through the selector valve 11, and through line 14 to an increase pitch chamber 31 of the torque unit 18. At the same time, the decrease pitch chamber 32 of the torque unit will be exposed to drain through lines 15, 13 and the valve guide 25. The torque unit 18 is shown schematically as including a cylinder 33 having disposed therein a piston 34, which divides the cylinder into the increase and decrease pitch chambers. The piston 34 is operatively connected by means of a rack and pinion combination, designated by 35, to the propeller blade 3. Thus, downward movement of the piston 34 will effect an increase in the pitch position of the blade 3. During an underspeed condition, the opposite conditions will prevail and fluid pressure in decrease pitch chamber 32 will effect an upward movement of the piston 34, as viewed in Fig. 2, and move the blade 3 to a lesser pitch position.

The beta distributor valve 9 comprises a valve guide 36 provided with a supply port connected with line 7, and a pair of control ports connected with lines 16 and 17. Disposed within the valve guide 36 is a plunger 37 having a pair of lands adapted to control the flow of fluid through the control ports thereof. One end of the plunger 37 is provided with a cam surface 38, which is adapted to engage an intermediate portion of a lever 39, which forms part of the beta distributor valve carriage 22. One end of the lever 39 is associated with a yoke 40 connected to a shoe 41, which is adapted to ride in a grooved control ring 42. The grooved control ring 42 is adapted for reciprocal movement through rotation of a high lead screw 43 threadedly engaging the same and rotated by movement of the power lever 19 through the linkages 20 and 21. The other end of the lever is associated with a second yoke 44, which is, likewise, adapted for reciprocal movement by means of rotation of a high lead screw 45 threadedly engaging the same. The high lead screw 45 is rotated by a rotary feedback mechanism to be described. Suffice it here to say that upon movement of the power lever into the beta regime, the linkages 20 and 21 will effect movement of the yoke 40 and the lever 39 to position the plunger 37 to obtain a selected pitch position. When the selected pitch position has been obtained by the blades 3, a rotary feedback mechanism will reposition the distributor valve plunger through movement of the yoke 44 and the lever 39. It is readily apparent that as the lever 39 moves about one of its ends, the intermediate portion thereof in engagement with the cam surface 38 will effect reciprocal movements of the plunger 37. The cam surface 38 is maintained in engagement with the lever 39 by means of a spring 46.

The selector control 10 includes a valve casing having a supply port 47 and a distribution port 48. Mounted within the valve guide is a valve plunger 49, which controls communication between ports 47 and 48. One end of the plunger 49 is connected at 50 with the mechanical linkage 20. The control port 48 is connected by line 51 to a servo chamber 52 of the selector valve 11. The selector valve 11 includes a housing 53 having four inlet ports 54, 55, 56, and 57, and two outlet ports 58 and 59. Disposed within the housing 53 is a plunger 60 having a series of spaced lands 61, 62, and 63. The plunger 60 is normally urged to the position shown in Fig. 2 by means of a spring 64. In this position, communication between lines 12 and 13 and lines 14 and 15 is afforded while communication between lines 16 and 17 and lines 14 and 15 is blocked. When the beta regime is selected through movements of the lever 19, fluid pressure from trunk line 7 is applied from line 65, through ports 47 and 48 to the servo chamber 52 of the selector valve. In this manner, the plunger 60 is moved downwardly to afford communication between lines 14 and 15 and lines 16 and 17, respectively, while blocking communication between lines 14 and 15 and lines 12 and 13, respectively. In this instance, movements of the torque unit piston 34 under the control of the beta distributor valve 9 and the governor valve 8 is rendered functionally inoperative. The aforegoing disclosure of the fluid pressure circuit forms no part of the present invention except as to point out the utility and applicability thereof to a variable pitch propeller. However, it is to be noted that the fluid pressure circuit referred to is by way of example and not by limitation.

Referring to Fig. 3, a rotary feedback mechanism for repositioning the beta distributor valve carriage 22 will be dealt with in detail. The structural embodiment of the torque unit 18 is only partially shown and conforms generally to the structure disclosed in the previously referred to Blanchard et al. patents. A propeller blade 3, which is not shown in Fig. 3, is operatively connected to an indexing ring 65, which, in turn, is operatively connected with a blade gear 66. Accordingly, movement of the blade gear is representative of the movements transmitted to one of the propeller blades 3. The blade gear 66 meshes with a master gear 67, which coordinates the movements of all of the propeller blades as a unit. The master gear 67 is journaled for rotation by bearing means 68 on a sleeve 69 supported within a propeller hub 1. The master gear 67 is provided with an axially extending flange portion 70, which is connected by suitable screw devices 71 to a feedback ring 73. The propeller shaft 2 is adapted to project within the opening defined by sleeve 69 and is operatively connected by means, not shown, to the propeller hub 1.

Referring more particularly to Figs. 4 and 5, the construction of the feedback ring 73 will be dealt with in greater detail. The feedback ring 73 is provided on one end with a radially extending annular flange 74. On the outer circumferential surface of the flange 74, and axially separated thereon, are a series of teeth 75 and an annular flange 76. The teeth 75 are removed for the arcuate distance designated by a, which, in the instant disclosure, is 41° 30'. The flange 76 is relieved throughout a predetermined arcuate segment, below the root diameter of the teeth 75, throughout an arcuate distance b, which is disposed angularly adjacent the arcuate segment a. In the instant disclosure, the angle b is 84°. The gear teeth immediately adjacent the toothless section throughout the angle a are topped at 77 and 78 to provide clearance, the purpose of which will be later apparent. In addition, the end 79 of the flange 76, adjacent the topped gear tooth 77, is sloped along a radius, while the other end 80 of the flange is formed as an abrupt change in configuration. In addition, a portion of the internal circumferential surface of the ring member 74 is provided with separated toothed portions 81, 82 and 83, which form no part of the present invention.

Referring again to Fig. 3, it is apparent that the radially extending annular flange 74, having the toothed portion 75 and the flange 76, is mounted for engagement with a feedback pinion assembly 84. Referring to Figs. 6 and 7, the feedback pinion assembly 84 is shown as comprising a pinion gear 85 provided with an integral axial extension 86 of generally circular configuration except for a flat 87 formed thereon. The end surface of the extending portion 86 is further provided with serrations 88. Referring again to Fig. 3, the feedback pinion assembly 84 is rotatably journaled on a reduced diameter extension 89 of a rotary feedback shaft 90. The feedback shaft 90 extends through a bore 91 in the propeller hub 1, and the extension 89 is rotatably journaled by bearing means 92 supported in a cup-shaped member 93 that is attached to a ring 94, which, in turn, is anchored to the propeller hub 1, by any suitable means, not shown. Between the inner races of the bearings 92 and the pinion gear assembly 84 is a cup-shaped member 95, within which is disposed a spring 96. The serrations 88 on the extending portion 86 mate with similar serrations on a disc 97, which is rigidly attached to the extension 89 and the feedback shaft 90, by any suitable means, not shown. The mating serrations on the members 86 and 97 provide means for indexing the rotary feedback shaft 90. After indexing has been accomplished, the serrations are maintained in positive locked engagement by tightening nuts 98 and 99, which threadedly engage an end portion of the extension 89.

When the teeth 75 of the ring 73 engage the teeth of the pinion 85 throughout the angle $b$ of Fig. 4, rotation will be transmitted from master gear 67 through ring 73 and through teeth 75 and pinion 85 to the feedback shaft 90, by reason of the flange 76 being relieved throughout this angle. The flange 76 is disposed in contiguous relation with the axial extension 86 of the feedback pinion assembly 84. Accordingly, when the end of the flange 80 comes in contact with the portion 86, transmission of movement between the ring 73 and the pinion 85 will be prevented. Thus, the the beta distributor valve 9 has associated therewith intermittent drive mechanism. In the particular embodiment disclosed, the intermittent drive mechanism forms a part of the connection between the beta distributor valve and the feedback shaft 90 with the master gear 67. However, the inability to transmit movement between the feedback shaft 90 and the ring 73 will be of no moment, since when these conditions prevail, the torque unit piston 34 will have engaged a mechanical stop within the torque unit cylinder 33, which, in this instance, is one wall thereof. This position represents the lowest angle obtainable by the propeller blades 3. During rotation of the ring 73, when the angular segment $a$ is juxtaposed with the pinion 85, no movement will be transmitted to the feedback shaft 90, which will be held from rotation by means of the flange 76 being contiguously disposed with relation to the flat 87 of the extension 86. Moreover, when the topped gear tooth 78 engages the pinion 85, movement will, likewise, be prevented by the flange 76. If it is desired to include in the beta range the pitch angle positions from 50° positive to full feathering, it is only necessary to relieve again the flange below the root diameter of the teeth 75, starting at the top tooth 78.

The extent of the angle $a$ is determined by the range of blade angle desired in the governed speed regime, which, in the instant disclosure, is assumed to include a range from 10° positive to 50° positive. As the beta distributor valve 9 is functionally inoperative in the governed speed regime, there is no necessity for feedback movement. However, when operation in the beta regime is selected, the beta distributor valve is rendered functionally operative and the necessity arises for feedback movement to reposition the distributor valve plunger 37 when the selected blade angle has been obtained by the blades 3. Thus, the limited space allowed for movement of the beta distributor valve carriage 22 within a regulator disclosed in copending application, Serial No. 202,612, filed December 26, 1950, in the name of Treseder et al., is used to better advantage. That is, the carriage is only moved when the beta distributor valve 9 is functionally operative.

In operation, if the power lever 19 is moved to a position wherein the selector control valve plunger 49 is moved upwardly to connect ports 47 and 48, the selector valve plunger 60 will be moved downwardly, thereby connecting the beta distributor valve 9 with the torque unit 18 and disconnecting the speed sensitive valve 8 therefrom. In this instance, the power lever 19 is moved to a predetermined position calling for a predetermined blade angle outside of the governing range of angles which effect movement of lever 39 about yoke 44, by reason of the high lead screw 43, the control ring 42, the shoe 41, and the yoke 40. Through the cam surface 38, the plunger 37 will experience a movement either upwardly or downwardly, as viewed in Fig. 2. The torque unit piston 34 will move in the direction of the applied fluid pressure and will move the blades 3 to the selected position. During movements of the blades 3, the blade gear 66 will rotate the master gear 67 to effect movement of the ring 73 (Fig. 3). As the propeller is being operated in the beta regime, the toothed portion 75 of the ring 73 is in engagement with the pinion gear 85 within the angle $b$. Consequently, rotation will be transmitted between ring 73 and the feedback shaft 90, which will rotate the high lead screw 45 and move the yoke 44 about yoke 40 as a pivot to reposition the beta distributor valve plunger 37 when the blade angle selected by the power lever 19 has been obtained by the blades 3. During operation in the governed speed regime in which the several parts of the hydraulic fluid pressure circuit are in the position they are shown in Fig. 2, the beta distributor valve 9 is functionally inoperative. In this instance, the toothless portion of the ring 73 is disposed adjacent the pinion gear 85 and the flange 86 prevents movement of the rotary feedback shaft 90.

It is apparent from the foregoing description that the present invention provides feedback travel only when it is required. In this manner, the limited space provided for movement of the beta distributor feedback carriage may be used to better advantage in that more travel per degree of blade angle movement in the beta range is afforded. This construction provides for a more accurate and sensitive control in the beta regime of propeller operation, by reason of the lost motion means associated with the feedback mechanism during operation of the propeller in the governed speed regime.

While the embodiment of the present invention as herein disclosed, constitutes a preferred form, it is to be understood that other forms might be adopted.

What is claimed is as follows:

1. In a variable pitch propeller having governed speed and beta regimes of operation under the control of a fluid pressure system having a governor valve and a beta distributor valve, the combination of, a feedback mechanism operatively connected with said beta distributor valve for repositioning the same in the beta regime, said feedback mechanism including a driving member, a driven member, means affording transmission of movement therebetween during operation in the beta regime, and means including a lost motion mechanism between the driving and driven members for precluding transmission of movement therebetween during operation in the governed speed regime.

2. In a variable pitch propeller having blades rotatably journalled in a hub for pitch adjustment, a master gear operatively connected with said blades and rotatably journalled within said hub whereby adjustment of blade pitch will effect movement of said master gear, a member disposed within said hub and operatively connected with said master gear, a rotary feedback shaft journalled within said hub, and means associated with said member and shaft precluding transmission of movement therebetween for a predetermined movement of said master gear.

3. In a variable pitch propeller having blades rotatably journalled in a hub for pitch adjustment, a master gear operatively connected with said blades and rotatably journalled within said hub whereby adjustment of blade pitch will effect movement of said master gear, a member disposed within said hub and operatively connected with said master gear, a rotary feedback shaft journalled within said hub, means interposed between said member and shaft precluding rotation of said shaft throughout a first predetermined movement of said master gear, and means interposed between said member and shaft effecting rotation of said shaft throughout a second predetermined movement of said master gear.

4. In a variable pitch propeller having blades rotatably journalled in a hub for pitch adjustment, a master gear operatively connected with said blades and rotatably journalled within said hub whereby adjustment of blade pitch will effect movement of said master gear, a member disposed within said hub and operatively connected with said master gear, a rotary feedback shaft journalled within said hub, means effecting transmission of movement between said member and said shaft for a first predetermined movement of said master gear, and means including a lost motion mechanism between said member and said shaft precluding transmission of movement between said member and said shaft for a second predetermined movement of said master gear.

5. In a variable pitch propeller having blades rotatably journalled in a hub for pitch adjustment, a master gear operatively connected with said blades and rotatably journalled within said hub whereby adjustment of blade pitch will effect movement of said master gear, a member disposed within said hub and operatively connected with said master gear, a rotary feedback shaft journalled within said hub, a pinion gear assembly operatively connected to said shaft, and means associated with said member and located in juxtaposition to said pinion gear assembly precluding transmission of movement between said member and shaft throughout a first predetermined movement of said master gear and effecting transmission of movement between said member and said shaft throughout a second predetermined movement of said master gear.

6. The combination set forth in claim 5 wherein said means includes a partially toothed external portion of said member.

7. In a variable pitch propeller having governed speed and beta regimes of operation under the control of a fluid pressure system having governor valve means and beta distributor valve means, the combination of, intermittent drive mechanism operatively connected with said beta distributor valve means for positioning the same in the beta regime, said intermittent drive mechanism including a driving member, a driven member, means affording transmission of movement therebetween during operation in the beta regime, and means including a lost motion mechanism between the driving and driven members for precluding transmission of movement therebetween during operation in the governed speed regime.

References Cited in the file of this patent

UNITED STATES PATENTS

| | | |
|---|---|---|
| 959,119 | Davis | May 24, 1910 |
| 1,151,220 | Scherling | Aug. 24, 1915 |
| 1,432,494 | Regen | Oct. 17, 1922 |
| 1,578,882 | Earle | Mar. 30, 1926 |
| 1,891,545 | Kindervater | Dec. 20, 1932 |
| 2,352,140 | Trott | June 20, 1944 |
| 2,469,106 | Dickerman | May 3, 1949 |
| 2,507,671 | May | May 16, 1950 |
| 2,511,393 | Worthington | June 13, 1950 |
| 2,600,017 | Morris et al. | June 10, 1952 |
| 2,615,432 | Meddock | Oct. 28, 1952 |
| 2,640,555 | Cushman | June 2, 1953 |